Feb. 13, 1923.

W. E. BALLARD

PLOW CLEVIS

Filed Feb. 23, 1921

1,444,824

Inventor
WILLIAM E. BALLARD.

Patented Feb. 13, 1923.

1,444,824

UNITED STATES PATENT OFFICE.

WILLIAM E. BALLARD, OF BIRMINGHAM, ALABAMA.

PLOW CLEVIS.

Application filed February 23, 1921. Serial No. 447,064.

*To all whom it may concern:*

Be it known that I, WILLIAM E. BALLARD, a citizen of the United States, residing at Birmingham, in the county of Jefferson and State of Alabama, have invented certain new and useful Improvements in Plow Clevises; and I do hereby declare the following to be a full, clear, and exact description of the invention, such as will enable others skilled in the art to which it appertains to make and use the same.

The invention relates to draft attaching means for agricultural machinery, being designed specifically to provide a clevis for plows and analogous implements wherein the clevis is fixed and of such structure as to admit of the draft hitch being raised or lowered to regulate the pitch of the plow point.

Other objects and advantages will be apparent and suggest themselves as the nature of the invention is understood.

While the drawings illustrate an embodiment of the invention, it is to be understood that in adapting the same to meet different conditions and requirements, various changes in the form, proportion and minor details of construction may be resorted to without departing from the nature of the invention.

Figure 1:
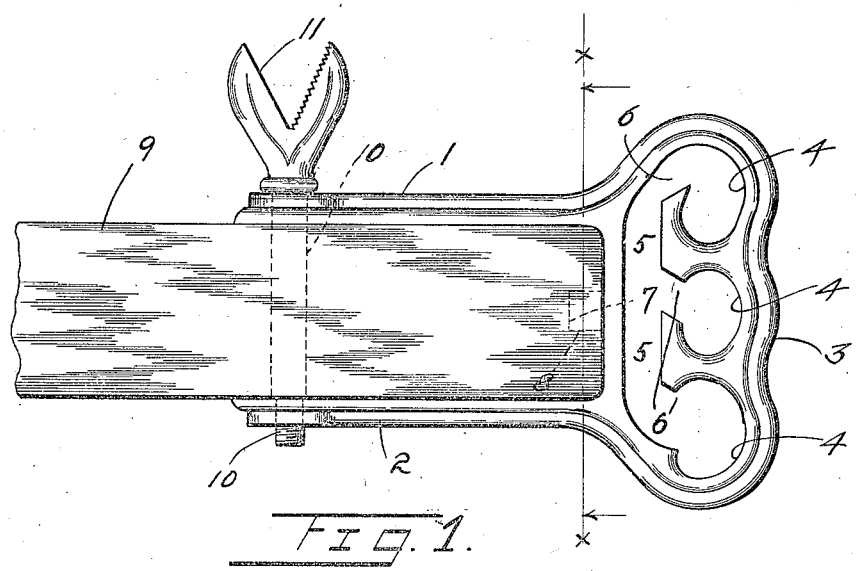
Figure 2:
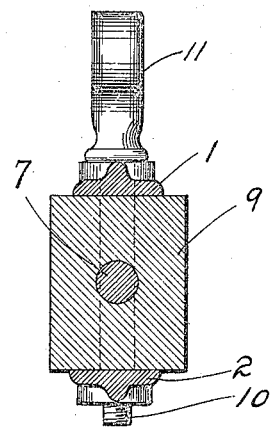

Referring to the accompanying drawings forming a part of the specification,

Figure 1 is a side view of the forward portion of a plow beam provided with a clevis embodying the invention, and Figure 2 is a transverse section on the line x—x of Figure 1.

Corresponding and like parts are referred to in the following description and designated in the several views of the drawings by like reference characters.

The clevis comprises upper and lower arms 1 and 2, respectively, and a head 3. These parts are preferably of integral formation consisting of a single casting. The head 3 is vertically elongated and provided with a plurality of draft hitch openings 4, a vertical passage 5 and throats 6 establishing communication between the passage 5 and the respective openings 4. The throats 6 are constricted but of such dimensions as to admit of the usual lap link or other form of draft hitch, not shown, passing therethrough when properly manipulated from the passage 5 to the openings 4 and vice versa. The throat 6 at the upper end of the passage 5 connects with the top of the uppermost opening 4. The other throats 6 lead into the respective openings 4 intermediate their upper and lower ends, whereby to leave projecting portions above and below the throat to obstruct the casual disengagement of the draft hitch from the opening 4 with which it is in engagement.

A tit or projection 7 extends rearwardly from the head 3 and enters an opening 8 formed in the front end of the plow beam 9. The arms 1 and 2 embrace the upper and lower sides of the plow beam and are connected thereto by means of a pin 10 which passes through openings formed in said arm and in the plow beam 9. The end 10 is provided at its upper end with a wrench head 11 embodying angularly disposed jaws. The pin 10 and head 11 constitute parts of an alligator wrench which may be utilized in the capacity of a wrench when required.

The clevis when in position is fixed and free from any pivotal movement. The point of application of the draft is adjusted by shifting the usual lap link or hitch from one to the other of the openings 4, such adjustment being effected by means of the throats 6 and the inter-communicating passage 5.

What is claimed is:

A clevis comprising a head, said head having a plurality of draft hitch openings, a passage being provided adjacent said openings whereby a draft hitch may be transferred from one opening to the other without detachment from the clevis, the head having throats connecting the respective draft hitch openings with the passage, said throats being constricted to prevent accidental disengagement of the draft hitch from the selected opening, the walls of said throats being substantially disposed at an angle, and one wall of said passage merging into walls of said throats to guide a draft hitch thereto.

In testimony whereof I affix my signature in presence of two witnesses.

WILLIAM E. BALLARD.

Witnesses:
 HALLIE HAWKINS,
 F. E. VANN.